United States Patent [19]

Stahler

[11] 3,928,640

[45] Dec. 23, 1975

[54] PRODUCTION OF SUBSTANTIALLY FULL-DIET BEEF CATTLE FEED THROUGH PROCESSING OF THE RUMEN CONTENT OF SLAUGHTERED CATTLE

[76] Inventor: Paul A. Stahler, Jordan, Minn. 55352

[22] Filed: June 15, 1973

[21] Appl. No.: 370,459

Related U.S. Application Data

[63] Continuation-in-part of Ser. No. 12,080, Feb. 17, 1970, abandoned, Continuation-in-part of Ser. No. 667,324, Sept. 7, 1967, Pat. No. 3,545,977.

[52] U.S. Cl. .................................. 426/465; 426/521
[51] Int. Cl.[2] ............................................. A23B 4/04
[58] Field of Search.... 426/478, 495, 465, 471–473, 426/807, 210, 518, 521; 210/65–68, 70, 71

[56] References Cited
UNITED STATES PATENTS

| | | | |
|---|---|---|---|
| 1,228,175 | 5/1917 | Berry | 99/2 |
| 2,204,703 | 6/1940 | Sanders | 260/112 |
| 3,550,524 | 12/1970 | Brumagim | 99/235 |
| 3,567,633 | 3/1971 | Valdespino | 210/71 |

Primary Examiner—Jack Sofer
Assistant Examiner—Hiram H. Bernstein
Attorney, Agent, or Firm—Williamson, Bains & Moore

[57] ABSTRACT

The process consists of making available the full contents of the rumen or paunch of commercially slaughtered cattle without any dilution or addition of substances thereto. Said contents per se are subjected to mechanical separation to remove up to 90% of the watery and liquid contents therefrom. The premium, relatively solid material left is in the form of clumps of matted fibers having other solids and semi-solids adhering thereto, such as coagulants, emulsions, and fat globules. Said matted and solid fraction is chopped or otherwise subdivided, rendering the separated particles more susceptible to the next vital step of flash-drying. Flash-drying of said fibrous, premium fraction is preferably carried out by a combined heating and conveying medium which applies a blast of high temperature air upon and through the divided fibrous fragments and particles while they are tumbled and dispersed. Such products contain protein (by weight) in a range from 10 to 12%; fats in a range from 3.3 to 3.8% and carbohydrates in a range from 70 to 80%. The extent and intensity of flash-drying may be varied to produce products varying in moisture content from 20 to 60% by weight.

4 Claims, 1 Drawing Figure

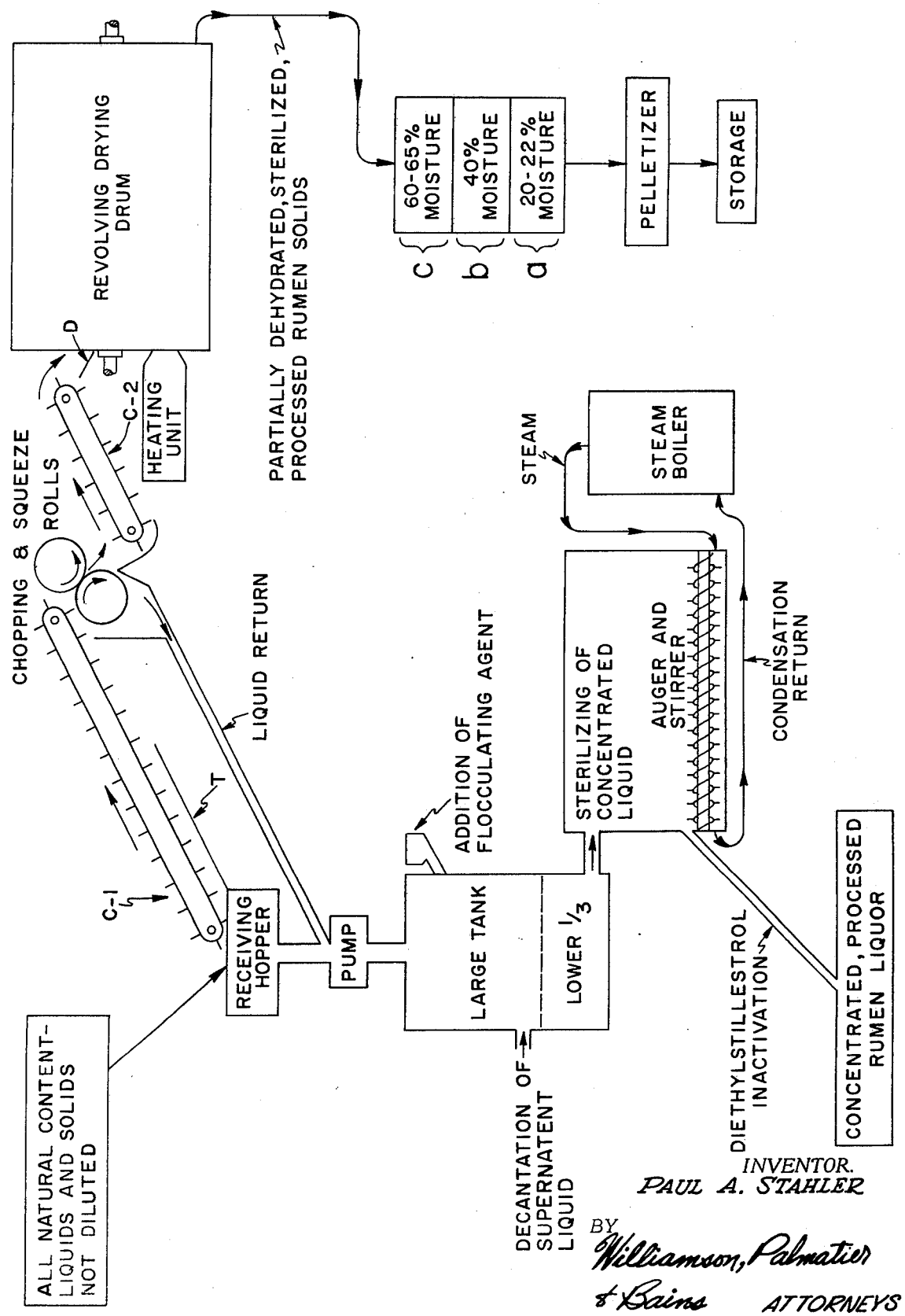

PRODUCTION OF SUBSTANTIALLY FULL-DIET BEEF CATTLE FEED THROUGH PROCESSING OF THE RUMEN CONTENT OF SLAUGHTERED CATTLE

This application is a continuation-in-part of copending application Ser. No. 12,080 now abandoned, filed Feb. 17, 1970, which application is a continuation-in-part of applicant's original application Ser. No. 667,324, filed Sept. 7, 1967, now U.S. Pat. No. 3,545,977. In the instant application, the invention is claimed for a premium cattle feed product and the novel process of producing the same, which through proven tests has been found to constitute up to 80% of full-diet requirements for nourishing and fattening beef cattle prior to slaughter.

BACKGROUND OF THE INVENTION

Explanation of Terms

The terms "paunch content" and "rumen content" herein both refer to the total material within the first stomach (and this is also known as the "paunch" or "the rumen") of cattle. This paunch or rumen content consists of partially digested feed materials, natural or prepared, recently eaten by the animal before slaughter, together with digestive juices and millions of bacteria, most of which normally live in the rumen and perform an essential role in the digestive process of cattle. The average amount of this material contained in the paunch of said slaughtered cattle weighs approximately 57 pounds and measures between 7 and 8 gallons.

Serious Problems Foreshadowing the Invention a. In the Packing Industry

Since the packing industry's conception, approximately 75 years ago, the paunch content of slaughtered animals has routinely been flushed down the sewer. Because of the consistency of such material, additional large amounts of water were required in the flushing process and, therefore, added to the volume of the total sewage.

The economic status of the packing industry at present requires a careful reevaluation of production costs in order to maintain a justified margin of profit. Water costs as well as sewage costs constitute an important percentage in these production expenses. The cost for sewage services is based on the volume of sewage as well as the Biological Oxygen Demand of the sewage material. The Biological Oxygen Demand, hereinafter referred to as "B.O.D." signifies the amount of oxygen that a specific amount of sewage will use in a 5 day period and is measured in parts per million (ppm). By way of simple explanation using a hypothetical example, let us suppose that we have one million pounds of sewage which in a 5 day period consumed 100 pounds of oxygen in the normal process of degeneration. The B.O.D. of the sewage would then be 100. The B.O.D. of paunch material is extremely high by comparison with normal sewage. This further complicates the problems with which packing plants are today confronted.

b. In Sewage Disposal Plants

The sewage disposal plants in our larger cities where packing industries are located are generally overburdened. Current national and state programs of Water Pollution Control have clearly demonstrated the need for the development of more efficient sewage treatment methods and, wherever possible, the diminution of industrial waste entering the sewage systems.

By its very nature the paunch material entering sewage systems poses special problems since the solid portions of such material are extremely difficult to decompose in sewage treatment plants and produce a large volume of residue or sludge, which cannot be disposed of by means of dispersal into waterways, but must be removed from the decomposing chambers and is usually stock-piled in the form of solid refuse. Therefore, the volume as well as the "indigestibility" of the rumen material significantly adds to the already existing problems of city and town sewage disposal.

The magnitude and serious economical effects of the herein related sewage disposal problems affecting our national economy can be well demonstrated and calculated by the following statistical facts:

The records of the two major packing plants operating in the city of South Saint Paul, Minnesota, have been made available to me for several years relative to cattle slaughter, quantities of said paunch materials and means of disposal of the same. Furthermore, in a period of over a year, I have been supplied with whatever quantities of said paunch materials I needed, up to their total supply if desired, for my research and study. The following table shows the extent of the sewage disposal and waste problem as related to the said two major packing plants in South Saint Paul:

| | |
|---|---|
| Average number of cattle slaughtered per day | 2,200 |
| Average daily volume of paunch material | 15,500 gal. |
| Average daily weight paunch material | 125,000 lbs. or 62.5 ton |
| Average B.O.D. of normal paunch contents | 25,000 ptm. |
| Average daily B.O.D. of paunch material-oxygen | 2,640 lbs. |

The two major packers in the South Saint paul area, slaughter approximately 484,000 cattle per year, which constitutes about 1 2/10ths percent of the total commercial slaughter of cattle in the United States (amounting to 40,936,000 head in 1965). Thus, the yearly weight of paunch material constituting, at present, waste and sewage for the entire United States, can be approximately calculated by multiplying 62.5 tons by the number of packing plant working days in a year and then multiplying by 83⅓(100)/1.2, equaling about 1,850,000 tons.

Attempts at solving the said problems have been made in recent years by the packing industry, with suggestions from the sewage disposal industry. The results have been as follows:

The general procedure has been to blast the total paunch contents at the packing plant with high velocity streams of water, thereby dissolving soluble materials clinging to or adhered to coagulants or other sticky substances of the solid fibrous globules and matted material. The flushing water and liquids are then drained crudely from the remaining solid materials and flushed down the sewage system. The solids are conveyed out of the packing plant into a stockpile where attempts have been made to cause farmers to utilize the same as fertilizer, plant foods and solid fill. Such procedure, after heavy expenditure for the flushing water, still left the packing industry with the responsibility of the more difficult disposal of the separated solid. My exhaustive studies have demonstrated that the B.O.D. (as determined by the standard 5 day method) of the liquid portion of the paunch material alone, very closely approximated that of the total content, the reason being that the solid portion of the rumen material is extremely "undigestible," using little oxygen in a 5 day period while the digestible portion of the liquids of the rumen is decomposed very quickly, but utilizes all necessary oxygen.

My studies have brought to light that as a matter of economic importance to the packing industry, the B.O.D. level is not substantially lowered by the separation of solids from liquids in the paunch or rumen materials. It can therefore be logically concluded that the liquid, as well as the solids, must be diverted from the sewage system to solve the serious problems herein referred to.

My Experience and Knowledge Foreshadowing the Invention

From my early youth up and to the present time, I have actively participated in the raising and conditioning of high grade beef cattle for slaughter purposes. For the past eighteen years I have bred and purchased calves (feeders) and established a rather distinctive line of cattle herd at my ranch at Jordan, Minnesota. Through the efforts of myself and my employees I have conditioned such beef cattle and sold them for slaughter purposes. Such work and experience has caused me to be familiar with and to have used most of the commercially successful beef-cattle feeds as well as the feeds and beef-feeding programs recommended by the U.S. Department of Agriculture. It is well known that the Department of Agriculture recommends for beef-cattle feeding natural cereal grains, alfalfa, silage, pellets and other ingredients wherein the overall diet supplied contains a protein content of between 10 and 12%, a fat content in the range of 3.5 to 4% and carbohydrate content in the neighborhood of 70% (all by weight).

I am a medical doctor and have been constantly engaged in the general practice of medicine since my admission to practice with the exception of a two-year period where my entire time was devoted to the developing, testing and reduction to practice of the invention herein. In my earlier practice for a period of about two years, I was company doctor for the Armour Packing Company at its plant located at South St. Paul, Minnesota. While so employed I become thoroughly conversant with all slaughtering, inspection and conditioning processes practiced there, as well as with the serious sewage and disposal problems associated particularly with the intestines, stomach contents and other waste and sludge materials constituting offal in the slaughtering processes. The only disposal of such offal of which I had knowledge during my employment by Armour's other than by oxidation and sewage methods, constituted in some cases the piling up of such waste material for hauling and use by farmers as a fertilizer.

My medical knowledge and my said experiences, together with intimate knowledge of the anatomy and pathology of slaughter animals, convinced me that substantial nutritive substances including proteins, vitamins, fats, carbohydrates and minerals were present and should be made available from the contents of the stomachs of slaughter cattle, which prior to my discoveries were treated only as waste or offal. Therefore I developed a keen and motivating interest in learning all I could relative to the bacteriology, chemical evaluation and analysis and conversions of the so-called waste materials of the several stomachs and intestines of slaughter animals, particularly beef cattle. To this end, I consulted with authorities in the field of cattle diet in the Department of Animal Husbandry at the University of Minnesota, including many conversations with Dr. Lester Hansen, at that time Chief of Animal Husbandry at said University.

A review of all of the articles, text books and other knowledge at hand at said University, showed that while some attempts to feed contents of the alimentary tract to swine had been attempted in World War 2 in Holland; and while manure from slaughter animals sometimes added to contents of cattle stomachs, had been dried through sustained heating processes, there was no shred of evidence that rumen contents of beef cattle per se had ever been successfully proceeded to provide nutritive beef cattle feed ingredients (much less a substantially complete dietary cattle feed) having any potency or commercial significance.

Following my digest of knowledge obtained from the Animal Husbandry Department at the University of Minnesota I personally conducted tests and experiments in the areas of dietary evaluation, bacteriology and conversions of the contents of the upper three stomachs of slaughtered cattle and determined that the contents per se of the rumen or paunch supplied by far the greatest opportunity for recovery and conversion of desired nutritive substances for beef-cattle feed.

In such experiments I dehydrated by sustained, continuous drying, the contents individually of the upper three stomachs of slaughtered cattle, as well as a mixture of the aggregate contents of the several stomachs of slaughtered cattle. These dry products were analyzed and in some instances I fed them to cattle but the protein and desirable fat content produced in all of said tests were insignificant and absolutely failed to solve the problem. Sustained drying of the entire rumen contents per se afforded better results than those obtained from any of my other said experiments but in the best example and analysis of dried contents the product contained only 3% protein and less than ½% dietary fat by weight.

Patent Office Prior Art

In the prosecution of my co-pending application, Ser. No. 12,080 of which this application is a continuation-in-part, the Patent Office Examiners cited several prior patents and one published magazine article which in applicant's judgement failed to anticipate or otherwise make unpatentable the substance and heart of my invention disclosed herein. Identification and brief explanation of the scope of said several pieces of prior art follow, to wit:

Berry — U.S. Pat. No. 1,228,175 — Issued 5-29-17. This patent describes, for alleged use as a stock feed, "the stomach contents of farm stock such, for instance, as cattle, sheep and hogs * * * whereby to not only realize profit from such by-product of stock, but also to obtain a feed which is nutritious and of greater value for stock feeding than natural foods, by reason of the presence therein of the gastric and other digestive juices of the stomach." Preferably the stomach contents of cattle and hogs are mixed together and the mixture is subjected to a sterilizing and drying treatment. Alternately the stomach contents of the two animals may be separately dried and sterilized and then thoroughly mixed. After the drying treatment salt and chopped hay is added to the dried stomach content mixture. Preferably brown sugar at the ratio of 5% is added in addition.

While the patent, lines 54 to 55 state "in some cases the contents of one animal alone might be sufficient," there is not the least suggestion in Berry of total and per se contents of the paunch or rumen of cattle, nor any mention of paunch material in the entire specification. Berry classifies the stomachs of hogs with the several different stomachs of sheep and cattle; he made no chemical or other analysis of his alleged final product; nor does he recite any feeding tests. His process consists in the one step of sustained drying by heat of the entire contents, all stomachs of one animal or the admixed stomach ingredients of hogs, cattle and sheep without any intervening step of before-heat drying, removing the watery or liquid portions of the contents. Obviously he never discovered the formulation of potent or commercially significant cattle feeds which required removal of by far the larger liquid portion of the contents by weight and the thereafter quick and flash-drying of the fibrous or relatively solid portions of the ingredients of rumen per se as discovered by applicant.

An article published in November, 1944 by John C. Hammond appearing in "Poultry Science," Vol. 23, pp 471–476 for the sole purposes of providing a partial substitute for alfalfa leaf meal in poultry feeds, first discloses that addition of dried cow manure to a diet deficient in riboflavin improved growth in chickens and was not detrimental when added to a complete diet. Feeding tests of the mixture of feedstuffs containing a small amount of cattle manure were recited and showed good results. Later in the article rumen content was substituted for the manure and was dried by sustained drying in a period of 24 hours in a large electric drying oven. The dried rumen and manure products were added to conventional poultry feed substances which included peanut meal, corn gluten meal, or soybean meal or corn oil meal, to an extent of at least 23% of the mixture with 50% dried distiller's solubles, wheat bran, ground limestone and vitamins A and B. Hammond discovered no distinction in nutritive properties between sustained, dried manure and sustained dried rumen content. He discovered only that the dried products of manure and rumen could be beneficially substituted for alfalfa leaf meal as a very minor ingredient of an overall poultry feed.

There is not the slightest suggestion in the Hammond article of applicant's discovery that by physically removing the great percentage by weight of the entire rumen contents, then the remaining fibrous and relatively dried material with adhering coagulants and globules could be very quickly flash-dried with unexpected containment of high protein count (up to 12%), valuable vitamins and minerals and riboflavin, and a fat content of 3.8%.

Anthony — U.S. Pat. No. 3,375,116 — Issued 3-26-68.

This patent describes a process of recovering feed substances from manure and water. Anthony first washes the manure with water and separates out by screen, coarse material. The thinner material is sustain-dried and mixed with corn to the amount of 87.5%, salt, phosphate, limestone, and the like. He recites practical use of the recovered product for feeding swine. Certainly this patent does not disclose any insight on the part of Anthony recognizing as unexpected and unusual nutritive source the most valuable parts of the whole rumen content per se of beef cattle after slaughter; nor does Anthony suggest the first step of utilizing full rumen content, then mechanically separating out most of the watery or liquid substances, and then quick or flash-drying the fibrous and relatively solid contents of the rumen. The flash-drying in applicant's invention is made possible by mechanical removal of over 80% of the liquid contents at the head of the mill or apparatus of applicant's. With flash-drying a large percentage amount of protein is made possible and no injury to vitamins, mineral content and riboflavin occurs.

Malcolm — British Pat. No. 116,318.

This patent described use of the stomachs of the ox for pig or poultry food. Specifically it discloses use of the third stomach or omasum for a mixed food for fattening stock. The process describes cutting up the stomachs and their contents and then steam cooking under steam pressure in an exhaust dryer and pulverizer which sustains the drying heat throughout drying of all the liquid ingredients as well as the fibrous ingredients.

SUMMARY OF INVENTION

The problems as recited in pages 6 and 7 of this application were solved by my discovery and conception of a novel process of treatment and conversion of the entire paunch contents of slaughtered cattle which will be briefly described here. The overall invention includes the discovery of a new reconstituted high protein feed for beef cattle which in my extensive experience in feeding my herd successfully comprised up to 80% of the entire full diet requirements for nourishing and flattening beef cattle for slaughter.

Broadly speaking, my process consists in the following combination of steps:

First the total contents of the rumen or paunch from commercially slaughtered cattle are obtained without dilution or addition of any substances. It is essential that the rumen material per se shall not be diluted by water or other additives. Washing of the contents prior to my processing proved fatal to success.

Next, the total contents of the rumen are subjected to steps to physically, without chemical effect, separate the more solid and fibrous materials from the liquids, Such step or steps may include compression of the entire contents, drainage and suction to the end that preferably 90% of the liquids present in the natural rumen content are removed leaving clumps of fibrous and other solid materials matted and somewhat disintegrated and having many important adherent substances such as coagulants, emulsions and fat globules present. Such sticky surfaces in turn adhere other solid and semisolid ingredients thereto as the first fraction.

The liquid or second fraction removed is in a semiliquid mass flowable by gravity and in the light of my discoveries and as hereinafter briefly recited is processed to constitute a valuable hog feed. The entire process, including the treatment and conditioning of the second or liquid fraction, constitutes an important part of my original application Ser. No. 667,324, filed Sept. 7, 1967, and which matured into U.S. Pat. No. 3,545,977 on Dec. 8, 1970.

The matted and fibrous fraction is preferably, after its separation and/or during physical separation of liquids, chopped or subdivided to produce an ultimate smaller particle size and further to render it more susceptible to the next vital step which constitutes the very fast or flash drying of the relatively solid fraction material.

My previous experiments showed me that any sustained heating of the entire rumen contents destroyed a substantial amount of the natural protein content in the rumen and destroyed most of the vitamens present in the paunch including amino acid and riboflavin. To attain success in the solution of the problem, preferably about 90% of the total liquid and watery ingredients of the paunch had to be removed before drying of the fibrous and solid portions. Drying of the first and most valuable fraction (for beef cattle feed) I discovered could be very rapid and continuous. I successfully employed drying apparatus of a preferably elongate rotary drum-type heating chamber having spiral or staggered deflectors or vanes on the interior wall which served as conveying means to move, drop and tumble the then chopped or divided fibrous material moving the same rather rapidly toward its discharge end. A source of heat preferably of the type of a unit heater discharging a very strong blast of high temperature air is employed in communication with the entrance end of the drum rotor blasting with forced draft air at a high temperature in the direction of the discharge. Thus the divided or chopped fragments or clumps falling and dispersed through the housing are flash-dried in the course of usually less than 8 minutes of travel and to an extent through a control of temperature to sterilize the nutritional substances in semi-digested condition, but as I found, with numerous reductions to practice, such heating is not sustained to the end of losing any of the natural protein ingredients, vitamins or minerals. The duration of travel of particles through said conveying and beating medium can be within a range of from 7 to 10 minutes.

After adequate sterilization, heating and drying of the solid fragment, the products are then highly suitable for animal feed containing sterilized nutritional substances in semi-digested condition and readily assimilable. The primary use of such products (solid fraction) is for beef feeding. Commercially, it may well be desirable to dry and sterilize the solid substances to a moisture content within a range of from 20 to 22% after which the material may be readily pelletized and kept in storage and conveniently shipped and sold for feeding of cattle.

It is to be understood that products less dry, even having a moisture content of 60 to 65% may be employed quite promptly after production, for bunker and other feeding of cattle and the like.

The liquid fraction obtained from separation of the entire paunch materials constitutes a very important and commercially significant nutritive substance for animal feeding. In processing this liquid, my inventions essentially employ the collection in a large holding tank, of the liquid ingredients free of solvent, or additive water and the like, to be initially treated with a nutritive flocculating agent which will partially precipitate the nutritive material from the paunch liquid, and also reduce the useful volume to about 1/3rd of the original. The concentrated liquid usually constituting about one third of the lower contents of the tank, will be pumped into a large volume vat or equivalent sterilizer, lined or provided intermittently with steam coils or flues for sterilizing the liquid material and killing bacteria therein. The concentrated liquid, after stirring and heat treatment at temperatures to sterilize, is further treated for diethylstillestrol inactivation, and then in concentrated, processed state with about the consistency of pea soup, constitutes a rumen liquor which is of high commercial value and nutrition, as an additive to animal feeds for hogs and other animals and fowl where cereal grain such as corn, oats and other natural food ingredients are employed.

The decanted thinner liquid not utilized or sterilized has commercial value in acting as a liquid catalyst in the degeneration of the manure content in holding pits and the like for hogs, and is ready for use in such capacities after withdrawal from the large holding tank.

My invention or inventions comprise also the production of two important, premium animal feed products which, to the best of my knowledge, are new and patentable in the industry as feed compositions, to wit:

1. The solid composition previously described in matted fibrous form (before pelletization) containing the partially digested solid cattle rumen fibers in somewhat matted, chopped state, with globules, coagulants and dried emulsions adhering thereto, having a protein content in the range of from 10 to 12%, a fat content of from 3.1 to 3.8%, with the entire mass being thoroughly sterilized and heated to the extent of preliminary cooking.

2. A semiliquid or liquor having a consistency approximating that of pea soup and containing globules, emulsions and water-soluble ingredients, and having in all a protein content within a range of from 1.7 to 2.3%; a fat content within a range of from 0.2 to 0.5% by weight (covered by my U.S. Pat. No. 3,545,977).

Both feed compositions are relatively high in amino acids and both compositions have been sterilized and contain no active bacteria or other organisms.

DESCRIPTION OF A SUCCESSFUL EMBODIMENT

In this application the new high nutritive beef cattle feed produced and the process of treating, conditioning and reconverting the premium solid fraction are those parts of my overall invention to be claimed herein. Ultimate production of a beef cattle feed comprising at least 75% of full dietary requirements, containing in excess of 11% protein, 3.8% fats and requisite carbohydrates and fiber have been continuously obtained in actual reduction to practice of the invention.

The drawing constituting a part of this application schematically illustrates an embodiment of suitable apparatus which may be utilized, as for large scale production and carrying out of my processes.

As indicated, the entire natural content of the rumens and/or paunches of slaughtered cattle, liquids and solids, without dilution or addition of water or other solvent, are conveyed or otherwise hauled and dumped in a large receiving hopper or pit, preferably having bottom suction and drainage facilities which are preferably connected with the intake of a pump. A suitable, foraminous conveyor C-1, having its receiving end preferably immersed in the contents of the receiving hopper, picks up fibrous and other solid materials from the mass and delivers the same at its outer end to apparatus for chopping up the clumps and compressing the solid material between squeeze rolls. It will be understood that in conjunction with the receiving end of conveyor C-1, power driven or manually operated loading mechanisms, such as rakes, forks, etc., may be employed to expedite reception of the solid material upon the conveyor C-1. It will further be understood that underlying conveyor C-1 has a collection trough T or the like for return of drainage liquor from the solids during the mass travel over conveyor C-1.

As indicated at the delivery end of conveyor C-1 the semisolid materials are chopped to break up and disintegrate clumps and thereafter pass between large compression or squeeze rolls, delivering the fibrous and solid material from such rolls upon the receiving end of a second conveyor C-2. This conveyor delivers the fibrous, compressed material with many sticky, adhering materials, globules and coagulants longitudinally (with assistance of an entrance deck D) into a large revolving drying drum. I have found that drying drums having spiral vanes or spirally staggered flights of dispersion and deflecting blades on the interior thereof are entirely satisfactory for purposes of my process.

The removal of the liquid and watery material from the rumen mass and the said dividing or chopping of the fibrous relatively solid premium fraction has preconditioned the said premium fraction for very fast or flash-drying which is requisite to ultimately produce from said fraction, beef cattle feed having the essential protein, fat, vitamin and other qualities to be commercially potent and significant. The said drum must act as a conveyor to receive and discharge the material during the flash-drying operation in a short period of time, usually within a range of from 7 minutes to 8½ minutes.

The said drum, having an open receiving end, is subjected throughout the interior thereof, to forced air heating as by unit heaters which blast air longitudinally therethrough and upon the tumbling and dispersed fibers and particles. The hot air blast-type heater delivers forced air at an initial high temperature of preferably from 2000° to 3000° F. The actual temperatures acquired by the tumbling and dispersed solid rumen material of course decrease progressively toward the delivery end of the drum. The drum, in its selected predetermined RPM and considering its dimensions, will tumble, drop, agitate and convey the solid material as the same is heated, without producing balling action on the said material. Samples may be taken and tested for moisture content from the right or delivery end of the drying drum.

I have experimented with and obtained partially dehydrated, sterilized processed rumen solids and extensively fed the same to beef cattle for finishing, within ranges of several moisture contents. As shown in the drawing, a fraction is frequently obtained having a moisture content from 60% to 65% which is immediately available for bunker feeding to beef cattle.

I have also extracted a fraction, indicated as B in the drawings, at about 40% moisture content. This fraction has good keeping qualities since all bacteria has been killed, and may be stored for several weeks and fed to cattle.

A third fraction has frequently been obtained in my tests, indicated as (a), having a moisture content of from 20 to 22% by weight. This solid material may be the most desirable for commercially profitable premium cattle feeds, and preferably is put through a pelletizer where the contents are quite permanently preserved for storage, subsequent sale and utilization over a storage period in excess of two years.

Referring back to the liquid contents of the natural paunch ingredients, it will be seen from the drawings that the liquid draining from conveyor C-1 and exuded from the squeeze rolls, is returned by liquid return to the intake of the pump. The output of the pump is connected with the top of a large tank, preferably of the capacity of about 16,000 gallons. To the top of this tank is added a requisite amount of a nutritional flocculating agent, which essentially constitutes a protein base colloid composed of intermediate and high molecular weight polymers. An exemplary ingredient for the use I desire, is a product commercially sold as "Swift's PPA" manufactured and sold by Swift and Company of Chicago, Illinois, to its industrial colloid department. This material has a pH approximating 6.5, forms a thin jell at temperatures below 80°F., and converts to a fluid when warmed above 80°F. The flocculant materials, diluted with warm water, is metered into the tank in continuous processing in a quantity and proportion of from 2 5/10ths to 5 parts per million, by volume.

The precipitates resulting from the foregoing flocculation are of greater specific gravity than the thin liquid, and gradually settle to the bottom of the large tank as indicated on the drawings. The heavier and lower contents of the tank approximating one third of the total capacity, is utilized for a premium animal feed concentrate or liquor and, as shown, is passed to the larger sterilizing vat which has circumferentially spaced along at least its lower portion, steam pipes or coils connected with steam at 15 pounds pressure from a steam boiler indicated at the right of the vat. This vat, for commercial production, should have a capacity of at least 6000 gallons. The vat near the lower portion thereof, is preferably provided with a longitudinal auger and stirrer which works with concentrated sterilized material to a delivery passage and simultaneously causes agitation and stirring of the entire contents of the vat. The delivery of the concentrated material, then in the form of a liquor at about the consistency of pea soup, is properly controlled and it will of course be understood that the sterilizing and concentration of the liquid is continued in the large vat for an adequate time to kill all live bacteria and organisms, and to have a cooking action on the ingredients. The discharge flow of the concentrated liquor from the vat is subjected to a diethylstillestrol inactivation and the liquor then is collected in suitable vats or containers and constitutes a preminum product of high nutritive value for use as a concentrate or additive to be admixed with natural animal feed ingredients such as cereal grains, corn, oats, etc.

In the diethylstillestrol inactivation, an inert or unabsorbable adherent is metered and introduced into the passage communicating the sterilizing tank of the drawings with the storage for the processed rumen liquor, minimal proportions being used which when such an ingredient as mineral oil is employed, would constitute approximately 3/10ths parts of the ingredient to 100 parts of the rumen liquor.

Before reciting an example of a substantial scale reduction to practice and tests made in accordance with my invention, and before reciting certain important feeding tests and knowledge I have obtained, it would be well to point out an unexpected discovery I made contributing to the conception of my invention, relative to the nutritive quality of the rumen contents of cattle where the animal has undergone the serious pre-slaughtering stresses. I have discovered that the nutritive quality of the rumen content of animals having undergone said pre-slaughtering stresses is definitely increased, both as to quantity and digestibility when compared with the rumen content of a beef animal, alive and living under normal conditions.

The pH of the rumen content of normal beef animals is definitely on the acid side, within a range of from 5.6 to 5.5. This fact may be determined from authorities on the subject as well as from my own personal tests on living beef animals. To the best of my knowledge, while doing repeated ph checks on the rumen content of cattle shortly after slaughter of the animal and where the paunch was opened in the routine manner of the packing industry, I discovered that the pH had changed towards a marked decrease in acidity into one approximating neutral or even slightly on the alkaline side (within a range of from 6.8 to 7.5). My repeated findings of such facts led me to further research as to the cause and effect thereof. The explanation of the above factual findings may be summarized in the following manner:

The animal (beef) is normally fed well, shortly before it leaves the feed lot. Subsequently this animal is sorted, loaded into a truck and transported to the stockyards. In the stockyards the animal is driven through various pens and alleys and finally enters the packing house building where further increasingly stimulating and excitable environmental factors tend to aggravate and irritate the animal as it proceeds to the actual slaughtering pen, so that at the moment before slaughter the animal is definitely in a high degree of excitation. These environmental factors stimulate an adrenalin reaction in the animal which in turn initiates a chain of reactions that have an end result on the rumen content.

The presence of the adrenalin causes constriction of the arteries leading to the rumen, which results in corresponding decrease in blood flow normally transporting the absorbable nutrients into the physiology of assimilation. This decreased blood return therefore inhibits or slows down the transport of the nutritive elements of the rumen, which under normal circumstances would be withdrawn from the rumen content in the same length of time.

The combination of interrelationships of these factors produces the following desirable end results:

1. There is considerably more material within the rumen of the slaughtered animal than would be present as compared to the time interval following feeding under normal conditions.
2. The material within the rumen has undergone a much greater degree of digestion than would be anticipated because of the increased number of digesting bacteria present.
3. The number of bacteria is markedly increased, and these bacteria themselves are readily absorbed as nutrition by the beef animals.
4. The material is in an unusually high state of digestive breakdown as compared to normal rumen content because of the delayed absorption of the digested material. Consequently, the animal which will subsequently be fed this material after the processing thereof will realize a higher degree of net energy for the purpose of growth and weight gain, because of the extensive digestive processes that it had undergone prior to the slaughter of the donor animal.

EXAMPLE

An embodiment of my two-fraction process, as disclosed herein and as carried out by the embodiment of apparatus schematically illustrated in the drawings, was made by me with a starting quantity of 2000 pounds of natural rumen content obtained from commercially and conventionally slaughtered cattle, in quantity comprising approximately 250 gallons. This natural rumen material, without addition of water, diluents, or any solvents, was separated into a raw liquid fraction and a raw solid fraction, generally utilizing the steps of my process illustrated in the accompanying drawings. This resulted in a raw liquid fraction weighing 1500 pounds, and a raw solid fraction weighing approximately 500 pounds.

The raw liquid fraction, which included liquids obtained from the suction and squeezing of the wetted solid material, was pumped to the top of the large tank illustrated in the drawings, and a nutritive flocculating agent added as previously described. Thereafter, the settled and concentrated portion of the large tank ingredients (approximately ⅓ in volume) were subjected to the sterilizing and concentrating action in the vat with stirring and agitation.

The processing of the wet solid fraction was carried out substantially as diagrammed in the drawings and as heretofore set forth.

The results and analysis of the two premium feed products obtained were as follows:

| SOLID, FIBROUS PRODUCT | 336 lbs. moisture content 40% by weight) |
|---|---|
| Protein (by weight) | 11% |
| Fat (by weight) | 3.4% |
| Carbohydrates (″) | 80% |
| LIQUOR PRODUCT | 500 lbs. pea soup consistency |
| Protein (by weight) | 1.8% |
| Fat ( ″ ) | 1.3% |
| Specific Gravity | 1.020% |
| Solids | 6.39% of total weight |
| pH | 6.9 |

FEEDINGS TESTS - SOLID, FIBROUS PRODUCT

Prior to filing my original patent application in September of 1967, I have experiment ally fed over 450 beef cattle for varying intervals with my premium solid product disclosed therein. While so doing for varying periods of one month and six weeks time intervals I had simultaneously fed assorted selection of young cattle with a diet generally accepted by beef cattle ranchers and as specified, i.e., in a pamphlet, published 1963 by the Agricultural Board of the National Academy of Sciences (a part of the National Research Council). My source of raw rumen content was obtained gratis (with my payment of handling charges) from two large packing plants in South St. Paul, Minnesota, to wit, Swift's and Armour's. Some of said material was obtained in large quantities some months of the year 1965. In the years 1966 and 1967 for at least three months of each year, adequate rumen material was received from these packing houses to enable me to feed a total of 500 young beef cattle which I sorted into two herds. In 1967

I started about June, to constantly feed my solid rumen product until my supply was cut off in late August by both of said packing houses. I supplemented my feeding of my premium product with between 25 and 30% of corn and other high protein additives and while I did not keep records of what gains on weight were made which are now available, I am sure that the gains of the 500 cattle during said period which were fed from my rumen product at least equaled the weight gains of some 200 cattle fed with the commercially accepted nutrient ingredients.

My sources of raw rumen content, the Swift and Armour plants, were able to again supply me with adequate rumen content for feeding the same beef cattle from about the middle of December 1967 until the 16th of Feb., 1968. During this period starting Dec. 9, 1967 until Feb. 26, 1968 I kept weekly records showing the gains in pounds averaging fourteen head of said test cattle, and from my weekly written reports I prepared graphs which are attached to an affidavit accompanying this application showing the gains per fourteen head of cattle weekly, from the middle of December, 1967 to Feb. 23, 1968, a graph being made on those feed products obtained from rumen supplied by Armour and a second graph being made for the rumen content supplied by Swift. The product from the Swift rumen was fed to smaller cattle whose weight for fourteen head averaged 8400 lbs., at start of feeding Jan. 19, 1968. By Jan. 29, 1968 this selected herd of 150 cattle averaged for fourteen head, 9200 lbs., and by Feb. 23rd, 1968, with continuous feeding, averaged 10,800 lbs.

The larger selected herd of 350 cattle fed from my premium product obtained from Armour's rumen content averaged for fourteen head at the start of feeding Dec. 28, 1967, 10,200 lbs. With continuous feeding these same cattle for fourteen head, on Jan. 23, 1968, averaged 10,800 lbs., and by Feb. 23, 1968, for fourteen head averaged 11,200 lbs. It is to be understood that in the said feeding tests recorded, my solid fibrous fraction disclosed in this application was constantly fed during the periods alleged, and constituted from 75 to 80% of the entire nutrient requirements of said beef cattle. The balance of from 20 to 25% by weight was made up of commercially accepted, high protein, high carbohydrate feeds.

In addition to the example and analysis of my premium solid fibrous product previously set forth herein, I personally made written records of 34 samples of the products which I actually fed to beef cattle experimentally during the years 1965, 1966 and 1967 and made a summary in precise proportions by weight in the content thereof. The content of said summary of samples within converted proportions of dry solid state showed by weight, protein 12%, fats 3.+%, ash 4% and carbohydrates 81%.

it will be understood that all of the analyses referred to denoting protein, fat, carbohydrate and ash content are made on the basis of conversion of the mass product to dry solid state.

FEEDING TESTS — SEMI-LIQUID OR LIQUOR PRODUCT

Prior to filing my original application I carried out carefully feeding tests on small hogs employing an experimental pen of 50 of such hogs and fed the same typical specimens of my liquor or semi-liquid product adding to said basic nutrition each day two feedings of hog feed as approved by the National Research Council to the extent of 250 gallons each day. This constituted by total volume of diet about 25%.

These tests on the experimental pen were carried out in comparison with tests of two other pens of 50 hogs each as control animals. One pen of said control was started on finishing feed two weeks before the experimental pen and a second pen of 50 hogs was started on week ahead of the finishing of the experimental pen. Both pens of control hogs were fed the recommended basic finishing feed with supplemental protein additives to bring the total protein up to 16% by weight.

Experimental hogs and also the control hogs in said two pens were confined and were in a controlled environment. The tests were carried on for a total five week period on the experimental hogs and on the control hogs were continued until all reached the requisite market weight (from 210 to 225 lbs.).

My tests proved that the experimental pen of 50 hogs reached market weight three weeks earlier than the average hogs of the two pens of the control hogs.

POTENTIAL SIGNIFICANCE OF MY INVENTIONS

The sewage and waste problem as applied to the many packing plants and slaughter houses of the United States may be to a large extent solved by the employment of my process through utilization of the total rumen content of slaughtered cattle.

In addition, through use and processing by slaughter houses these formerly waste products may be converted and reconstituted to provide a very substantial new source of slaughter animal feeds. The premium solid final product having the high protein and edible fat content is exceedingly important to the national economy in that is provides the ability to raise substantially more beef cattle with surprising economy. This premium product is high in digestible protein after conversion and reconstitution by my process. It also is high in amino acids, riboflavin and other protein "building blocks."

It is to be noted that the National Research Council through the Agricultural Board recommended combinations of natural corn, other cereals with essential vitamins and minerals which, in total feeding, would have (by solid content measurement) from 10 to 12% protein, and from 3 to 4% digestible fats and carbohydrates up to 80 or 85%. The composition of my preferred premium solid product is precisely within this range and examples have shown contents near the top of said range.

It will of course be understood that the basic steps of my new processes for converting total natural rumen content taken from slaughtered cattle, may be carried out by various different pieces of apparatus, and within variable measurements of temperature, moisture content and concentration of the globules, coagulants and solids in suspension of the liquid fraction of the rumen, all within the scope of my inventions as defined and set forth in the appended claims.

What is claimed is:

1. The process of treating the rumen content per se without dilution or additives of slaughtered cattle to produce at least 75 percent of full diet beef cattle feed requirements which consist in:

obtaining the whole rumen contents from slaughtered cattle without addition of dilutants or other substances, the whole rumen content including liquid and solid ingredients, mechanically removing at least 80% of the liquid ingredients from the solid and fibrous ingredients of said whole rumen content, said separated solid ingredients including matted fibers, adhering globules, coagulants, and emulsions, subdividing the separated fibrous materials, and drying the said fibrous and adhering materials by conveying said materials through a dryer heated at the entrance end by a forced air heater at a temperature of from 2000°F. to 3000°F, said material being conveyed through said dryer for a period of from seven to ten minutes.

2. The process as carried out by the steps defined in claim 1 further characterized by:

drying and sterilizing said separated solid fraction by blasting with said forced air heater the solid ingredients while they are tumbled, dispersed and conveyed to a discharge point.

3. The process and steps as defined in claim 1 further characterized by:

supplying said drying heat through the medium of a blast of hot air directed longitudinally through the solid ingredients during the tumbling and conveying, the emanating temperature of said air being in the neighborhood of 2000°F.

4. The process of claim 1 wherein the solid ingredients after dewatering are dryed to a moisture content of from 20–65% moisture.

* * * * *